(12) United States Patent
Papst

(10) Patent No.: US 6,271,988 B1
(45) Date of Patent: *Aug. 7, 2001

(54) DISK STORAGE DEVICE WITH IMPROVED SPINDLE TORQUE AND ACCELERATION

(75) Inventor: Georg F. Papst, Spaichingen (DE)

(73) Assignee: Papst Licensing GmbH & Co. KG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/239,786

(22) Filed: Jan. 29, 1999

Related U.S. Application Data

(63) Continuation of application No. 08/834,701, filed on Apr. 1, 1997, now Pat. No. 5,877,916.

(30) Foreign Application Priority Data

Jan. 4, 1997 (WO) .................................. PCT/EP97/01630

(51) Int. Cl.$^7$ .................................................... G11B 17/08
(52) U.S. Cl. ...................... 360/98.07; 360/99.08
(58) Field of Search ............................ 360/98.07, 99.04, 360/99.08

(56) References Cited

U.S. PATENT DOCUMENTS

| | | |
|---|---|---|
| Re. 32,702 | 6/1988 | Hasler et al. . |
| Re. 34,412 | 10/1993 | Elsasser et al. . |
| Re. 35,792 | 5/1998 | Elsasser et al. . |
| Re. 36,016 | 12/1998 | Cap et al. . |
| 3,250,929 | 5/1966 | Maier . |
| 3,596,121 | 7/1971 | Sheldon . |
| 3,691,542 | 9/1972 | Gabor . |
| 3,706,085 | 12/1972 | Mowrey et al. . |
| 3,845,339 | 10/1974 | Merkle et al. . |
| 3,864,748 | 2/1975 | Herdman et al. . |
| 3,922,590 | 11/1975 | Warren et al. . |
| 4,054,931 | 10/1977 | Bolton et al. . |
| 4,062,049 | 12/1977 | Dirks . |
| 4,101,945 | 7/1978 | Butsch . |

(List continued on next page.)

FOREIGN PATENT DOCUMENTS

| | | |
|---|---|---|
| 654 455 A5 | 2/1986 | (CH) . |
| 2325473 | 12/1974 | (DE) . |

(List continued on next page.)

OTHER PUBLICATIONS

Isozaki et al. "Fixed–Head Disk Memory Unit for High Reliabiliity Applications," *NEC Research & Development*, No. 44, Jan. 1977, pp. 57–67.

(List continued on next page.)

*Primary Examiner*—A. J. Heinz
(74) *Attorney, Agent, or Firm*—Finnegan, Henderson, Farabow, Garrett & Dunner, LLP

(57) ABSTRACT

A disk storage device that utilizes an inner rotor spindle motor in which the spindle shaft is fixed to the disk mounting hub and rotates therewith. Support for the spindle is provided by a bearing tube that has a greater diameter and greater rigidity than the stationary shaft or post typically employed to support the disk stack in an outer rotor arrangement. The bearing tube supports the bearings in which the spindle shaft is journalled and allows wider axial spacing between the bearings, reducing spindle run out. At the same time, the bearing tube functions to entrap contaminants from the bearings within the internal motor space and reduces contamination in the clean chamber. By configuring the inner rotor, including the disk support hub, to rotate around the outer diameter of the bearing tube, an elongated "gap seal" is formed, allowing more efficient containment of contaminants from the bearings without need for expensive ferrofluicdic seals. One end of the bearing tube extends into an internal cavity formed within the disk support hub. This arrangement requires the hub to have a hollow interior, providing for a rotor structure having further reduced mass, further improving acceleration and vibration characteristics of the spindle.

41 Claims, 6 Drawing Sheets

| Patent No. | Date | Inventor |
|---|---|---|
| 4,115,715 | 9/1978 | Müller . |
| 4,150,406 | 4/1979 | Stollorz . |
| 4,167,692 | 9/1979 | Sekiya et al. . |
| 4,174,484 | 11/1979 | Schmider . |
| 4,181,867 | 1/1980 | Muller . |
| 4,185,308 | 1/1980 | Fujioka . |
| 4,197,489 | 4/1980 | Dunn et al. . |
| 4,216,512 | 8/1980 | Vidwans . |
| 4,275,339 | 6/1981 | Burke et al. . |
| 4,285,016 | 8/1981 | Gilovich . |
| 4,307,425 | 12/1981 | Kaneko et al. . |
| 4,329,604 | 5/1982 | Dunstan et al. . |
| 4,336,470 | 6/1982 | Gutris . |
| 4,337,491 | 6/1982 | Hasler et al. . |
| 4,352,133 | 9/1982 | Hager . |
| 4,394,594 | 7/1983 | Schmider et al. . |
| 4,396,964 | 8/1983 | Morehouse et al. . |
| 4,430,603 | 2/1984 | Muller . |
| 4,438,542 | 3/1984 | Schuh . |
| 4,471,395 | 9/1984 | Beck et al. . |
| 4,519,010 | 5/1985 | Elsaesser et al. . |
| 4,535,373 | 8/1985 | Schuh . |
| 4,554,473 | 11/1985 | Muller . |
| 4,556,829 | 12/1985 | von der Heide . |
| 4,599,664 | 7/1986 | Schuh . |
| 4,604,665 | 8/1986 | Müller et al. . |
| 4,607,182 | 8/1986 | Ballhaus . |
| 4,656,545 | 4/1987 | Kakuta . |
| 4,658,312 | 4/1987 | Elsässer et al. . |
| 4,672,250 | 6/1987 | Seitz . |
| 4,698,542 | 10/1987 | Muller . |
| 4,701,653 | 10/1987 | Merkle et al. . |
| 4,739,425 | 4/1988 | Dierkes et al. . |
| 4,760,298 | 7/1988 | Kitahara et al. . |
| 4,775,906 | 10/1988 | Suzuki et al. . |
| 4,797,762 | 1/1989 | Levy et al. . |
| 4,805,055 | 2/1989 | Wright . |
| 4,843,500 | 6/1989 | Elsässer et al. . |
| 4,905,110 | 2/1990 | Krum et al. . |
| 4,922,406 | 5/1990 | Schuh . |
| 4,949,000 | 8/1990 | Petersen . |
| 4,965,476 | 10/1990 | Lin . |
| 4,991,211 | 2/1991 | Cap et al. . |
| 5,001,581 | 3/1991 | Elsasser et al. . |
| 5,128,819 | 7/1992 | Elsaesser et al. . |
| 5,132,856 | 7/1992 | Takahashi . |
| 5,157,295 | 10/1992 | Stefansky et al. . |
| 5,173,814 | 12/1992 | Elsasser et al. . |
| 5,216,557 | 6/1993 | Elsaesser et al. . |
| 5,256,922 | 10/1993 | Tanaka et al. . |
| 5,296,981 | 3/1994 | Ogawa . |
| 5,331,483 | 7/1994 | Muller et al. . |
| 5,333,079 | 7/1994 | Takegami et al. . |
| 5,352,947 | 10/1994 | MacLeod . |
| 5,382,853 | 1/1995 | von der Heide et al. . |
| 5,400,197 | 3/1995 | Jabbari et al. . |
| 5,410,201 | 4/1995 | Tanaka et al. . |
| 5,422,769 | 6/1995 | Elsaesser et al. . |
| 5,424,887 | 6/1995 | Schuh . |
| 5,444,586 | 8/1995 | Iftikar et al. . |
| 5,446,610 | 8/1995 | Elsaesser et al. . |
| 5,519,270 | 5/1996 | Yamada et al. . |
| 5,528,436 | 6/1996 | Peter . |
| 5,548,458 | 8/1996 | Pelstring et al. . |
| 5,557,487 | 9/1996 | Elsaesser et al. . |
| 5,596,235 | 1/1997 | Yazaki et al. . |
| 5,619,389 | 4/1997 | Dunfield et al. . |
| 5,661,351 | 8/1997 | von der Heide et al. . |
| 5,694,268 | * 12/1997 | Dunfield ............................ 360/98.07 |
| 5,708,539 | 1/1998 | Schuh . |
| 5,729,403 | 3/1998 | Schuh . |
| 5,774,302 | 6/1998 | Elsaesser et al. . |
| 5,777,822 | 7/1998 | Schuh . |
| 5,864,443 | 1/1999 | Elsaesser et al. . |
| 5,877,916 | 3/1999 | Papst . |
| 5,946,161 | 8/1999 | Schuh . |
| 6,005,746 | 12/1999 | Papst . |

FOREIGN PATENT DOCUMENTS

| | | |
|---|---|---|
| 2421379 | 11/1975 | (DE) . |
| 2749729 | 5/1979 | (DE) . |
| 3049334 A1 | 10/1981 | (DE) . |
| 3144629 A1 | 7/1982 | (DE) . |
| 3326543 | 1/1985 | (DE) . |
| 0 015 739 B1 | 4/1983 | (EP) . |
| 0 094 484 A1 | 11/1983 | (EP) . |
| 0 098 010 A1 | 1/1984 | (EP) . |
| 0 151 259 | 8/1985 | (EP) . |
| 0 172 459 | 2/1986 | (EP) . |
| 0 172 459 A2 | 2/1986 | (EP) . |
| 0 263 932 | 4/1988 | (EP) . |
| 287 768 | 10/1988 | (EP) . |
| 0291295 | 11/1988 | (EP) . |
| 425 312 A2 | 5/1991 | (EP) . |
| 0 685 843 A1 | 12/1995 | (EP) . |
| 1 328 717 | 8/1973 | (GB) . |
| 1 407 431 | 9/1975 | (GB) . |
| 1 434 192 | 5/1976 | (GB) . |
| 1 486 070 | 9/1977 | (GB) . |
| 1486070 | 9/1977 | (GB) . |
| 1 572 586 | 7/1980 | (GB) . |
| 2075240 | 11/1981 | (GB) . |
| 2 092 834 | 8/1982 | (GB) . |
| 2166586 | 5/1986 | (GB) . |
| 2195812 | 4/1988 | (GB) . |
| 2 218 857 | 11/1989 | (GB) . |
| 53-55509 | 10/1951 | (JP) . |
| 49-34714 | 6/1972 | (JP) . |
| 48-86510 | 11/1973 | (JP) . |
| 48-87809 | 11/1973 | (JP) . |
| 49-719909 | 7/1974 | (JP) . |
| 49-85110 | 7/1974 | (JP) . |
| Sho 50-128510 | 10/1975 | (JP) . |
| 50-152708 | 12/1975 | (JP) . |
| 51-33410 | 3/1976 | (JP) . |
| 51-57011 | 5/1976 | (JP) . |
| 51-26669 | 7/1976 | (JP) . |
| 51-84516 | 7/1976 | (JP) . |
| 51-121306 | 10/1976 | (JP) . |
| 51-151513 | 12/1976 | (JP) . |
| 52-6914 | 1/1977 | (JP) . |
| 52-42209 | 3/1977 | (JP) . |
| 52-170004 | 12/1977 | (JP) . |
| 53-39727 | 4/1978 | (JP) . |
| 53-51719 | 5/1978 | (JP) . |
| 53-55106 | 5/1978 | (JP) . |
| 53-55724 | 5/1978 | (JP) . |
| 53-57010 | 5/1978 | (JP) . |
| 53-76809 | 6/1978 | (JP) . |
| 54-41619 | 3/1979 | (JP) . |
| 49-46716 | 5/1979 | (JP) . |
| 54-58011 | 5/1979 | (JP) . |
| 54-139819 | 9/1979 | (JP) . |
| 54-136309 | 10/1979 | (JP) . |
| 54-156106 | 12/1979 | (JP) . |
| 55-141258 | 8/1980 | (JP) . |
| 56-107364 | 8/1981 | (JP) . |
| 58-22571 | 2/1983 | (JP) . |
| 58-30965 | 2/1983 | (JP) . |
| SHO 58-22571 | 2/1983 | (JP) . |

| | | |
|---|---|---|
| 58-159201 | 9/1983 | (JP) . |
| 58-200480 | 11/1983 | (JP) . |
| 60-103554 | 6/1985 | (JP) . |
| 62-125573 | 6/1987 | (JP) . |
| 03222150 | 10/1991 | (JP) . |
| 04172951 | 6/1992 | (JP) . |
| 04178151 | 6/1992 | (JP) . |
| 05094669 | 4/1993 | (JP) . |
| 08065941 | 3/1996 | (JP) . |
| WO 84/01863 | 5/1984 | (WO) . |

OTHER PUBLICATIONS

J. Swartz, "Motor in Spindle Gives Micro–Winchester Room for 140M Byes," *Mini–Micro Systems*, Feb. 1983, pp. 143–146.

M. Pearce, "Who Needs High Capacities?" *Computer Systems*, Nov. 1983, pp. 81–84.

V.J. Trotter, Jr., "Plastic Rigid Seat to Trap Airborne Submicron Particles," *IBM Technical Disclosure Bulletin*, vol. 19, No. 4, Sep. 1976, 1 page.

Control Data Corporation, Control Data Fixed Disk Drive; General Description, Operation, Installation and Checkout, Theory of Operation, Diagrams, Maintenance, Maintenance Aids, Parts Data; Magnetic Peripherals, Inc., Hardware Maintenance Manual, 6 pages.

German "Diskettenantrieb" Article, Apr. 1983, pp. 56–59.

Drawing "GAE Motor:" (1 sheet) Papst–Motoren KG.

Drawing "Motor 933 5310 00" (2 sheet) Papst–Motoren KG.

European Search Report, Application No. EP 97 10 5429 (Aug. 6, 1997).

European Search Report, Application No. EP 97 10 5430 (Aug. 6, 1997).

European Search Report, Application No. EP 97 10 5430 (Jan. 27, 1998).

International Search Report, Application No. PCT/EP97/01629 (Nov. 24, 1997).

International Search Report, Application No. PCT/EP97/01630 (Aug. 8, 1997).

United Kingdom Search Report, Application No. GB 9706578.3 (Jun. 18, 1997).

United Kingdom Search Report, Application No. GB 9706577.53 (Jun. 18, 1997).

\* cited by examiner

DISK STORAGE DEVICE WITH IMPROVED SPINDLE TORQUE AND ACCELERATION

This is a continuation of application Ser. No. 08/834,701, filed Apr. 1, 1997, now U.S. Pat. No. 5,877,916.

This invention relates to disk storage devices and, more particularly, to a disk storage device having a spindle motor with enhanced torque, acceleration and vibration characteristics.

BACKGROUND OF THE INVENTION

Disk storage devices, especially disk storage devices utilizing one or more rigid magnetic data storage disks directly coupled to the rotor of a spindle drive motor and housed within a "clean room" chamber, typically use an "outer rotor" brushless DC motor for rotating the storage disks past data read/write heads. The heads write and read digital data on the surface of the disks. in an "outer rotor" brushless motor, a rotor having an annular permanent magnet surrounds a multi-pole stator that is mounted concentric with the shaft defining the rotation axis of the motor.

An outer rotor motor employs a rotor that encompasses the stator element. The rotor therefore requires a diameter that adds to the mass and angular inertia of the rotor and increases the time required for the motor to reach the operating speed, which may be 6000 RPM or higher, at the time of startup. The radially displaced mass also amplifies vibrations due to imbalances, especially at higher operational speeds.

It is an object of the invention to provide a disk storage device that utilizes a spindle drive motor that has a reduced rotary mass and angular inertia and accordingly reduces the time required to accelerate the storage disks to operating speed at the time of startup.

It is another object to provide a disk storage device that utilizes a spindle motor that is not limited by the diameter of the disk support hub in providing sufficient torque to rapidly accelerate a stack of many disks at the time of startup.

It is a further object to provide a disk storage device that has an increased diameter spindle support structure to enhance the rigidity of the disk axis.

Still a further object is to provide a disk storage device that reduces the amount of spindle run out caused by play in the support bearings.

Another object is to provide a disk storage device that achieves an enhanced air gap seal between the clean chamber in which the disks operate and the spindle motor elements.

Yet another object is to provide a disk storage device that reduces radially-displaced spindle mass and is capable of operation at higher speeds with lower vibration.

SUMMARY OF THE INVENTION

The foregoing and other objects are achieved by providing a disk storage device that utilizes an inner rotor spindle motor in which the spindle shaft is fixed to the disk mounting rub and rotates therewith. Support for the spindle is provided by a bearing tube that has a greater diameter and greater rigidity than the stationary shaft or post typically employed to support the disk stack in an outer rotor arrangement. The bearing tube supports the bearings in which the spindle shaft is journalled and allows wider axial spacing between the bearings, reducing spindle run out. At the same time, the bearing tube functions to entrap contaminants from the bearings within the internal motor space and reduces contamination in the clean chamber.

By configuring the inner rotor, including the disk support hub, to rotate around the outer diameter of the bearing tube, an elongated "gap seal" is formed, allowing more efficient containment of contaminants from the bearings without need for expensive ferrofluidic seals. One end of the bearing tube extends into an internal cavity formed within the disk support hub. This arrangement requires the hub to have a hollow interior, providing for a rotor structure having further reduced mass, further improving acceleration and vibration characteristics of the spindle.

These and other objects, features and advantages of the invention are illustrated in the following description of preferred embodiments, as illustrated in the drawings as follows.

DETAILED DESCRIPTION OF PREFERRED EMBODIMENTS

Figure 1:
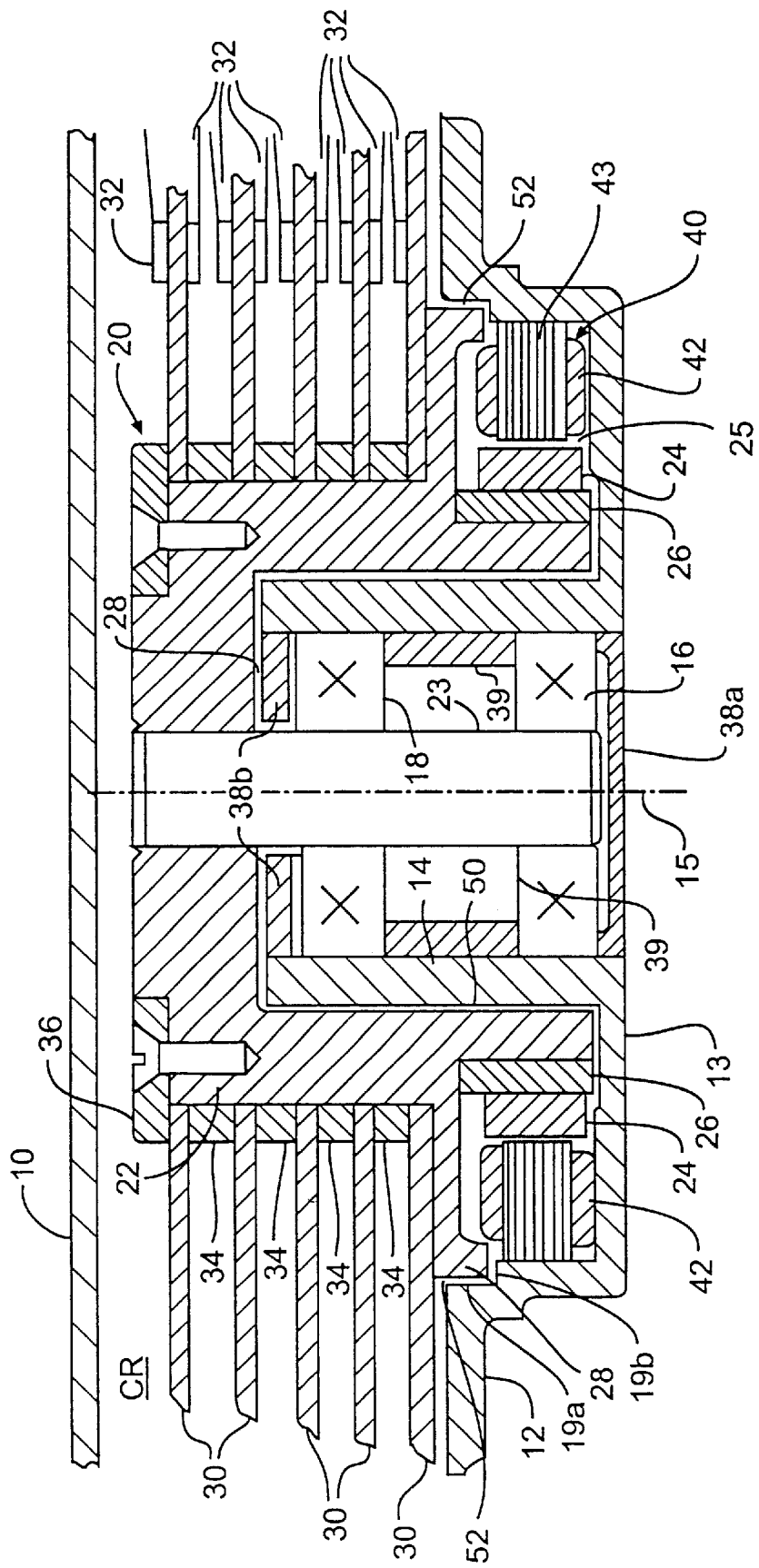
FIG. 1 is a cross-section taken along the spindle axis of a disk storage device employing a first embodiment of the invention.

Referring to FIG. 1, the disk storage device, which may be, for example, a magnetic hard disk drive (HDD), includes a housing having an upper partition or wall 10 and a lower partition or wall 12 which adjoin side walls (not shown) to enclose a substantially sealed "clean room chamber" CR. Clean room chamber CR is a finally sealed clean room manufactured to HDD industry contamination standards. One or more data storage disks 30 are located within the clean room chamber and cooperate with read/write heads 32. During operation the heads "fly" on a thin layer of air proximate to the surface of the rotating disks and function as transducers for magnetically reading and recording (writing) digital data in tracks on the surfaces of the disks.

The disks 30 are rotated at an operating speed that may be in the range of 3,000 to 10,000 RPM. The disks are mounted on a hub 22 that is part of a rotor assembly 20 of a brushless DC spindle motor. The drive elements of the spindle motor are supported inside the clean room chamber within a recessed portion 13 of the lower wall 12 of the HDD housing. Hub 22 is cylindrically shaped and dimensioned to fit through the center opening of the disks. The hub has a radially extending shoulder 28 for supporting the lower disk 30 that may be part of a disk stack. The hub 22 may be made of an aluminum alloy, which is a material that is suitable for use after machining in a clean room environment. One or more spacer rings 34 separate the disks and a clamping element 36 is fastened to the closed end of the rotor 20 and presses against the disk stack to couple the disks to the hub 22.

The rotor assembly 20 rotates on a shaft 23 that is press-fit into or otherwise attached to the closed end of the rotor. Shaft 23 is supported to rotate about the spindle axis 15 by a pair of axially spaced bearings 16 and 18. Bearings 16 and 18 are mounted within a bearing tube 14 or other form of cylindrical support member that is an integral part of, or is attached to, the recessed wall portion 13. Bearing spacer member 39 maintains the bearings 16 and 18 in the correct axial locations. The recessed wall portion 13 may be an integral part of the HDD housing wall 12, or it may be in the form of a detachable assembly flange. If the latter, the spindle motor can be manufactured as a separate unit that is installed into an opening in the HDD housing at the time of final HDD assembly.

The spindle motor further includes a permanent magnet 24 that is in the form of an annular ring affixed to a cylindrical ferromagnetic support member 26. The latter is attached to the lower end of the rotor hub portion 22. Hub 22 has a cylindrically-shaped central cavity 29 that fits over the upper end of bearing tube 14. A narrow gap 50 is formed between the outer surface of the bearing tube and the inner surface of the rotor 20 and forms a "gap seal" to reduce the transfer of particles and other contaminants emanating from the bearings 16 and 18 into the clean room chamber. A sealing washer 38b is inserted above bearing 18 to further enhance the effect of the seal. Conforming interior surfaces 19a and 19b of the housing wall 12 surround the edge of the disk mounting flange 28 of the hub 22. A narrow gap 52 is formed between the outer periphery of the flange 28 and the surfaces 19a and 19b and functions as a further gap seal to retard the transfer of contaminants into the clean room chamber. A cap 38a is inserted to close the opening at the lower end of bearing tube 14.

A stator assembly 40 is supported within the recessed wall portion 13 and encircles the rotor magnet 24. The stator 40 has windings 42 wound on the stator laminations 43 and a plurality of poles separated from the magnet 24 by a cylindrically-shaped air gap 25. As shown in FIG. 9, which illustrates the stator arrangement of the similar spindle motor of FIG. 8, the stator 40 (shown as 140 in FIG. 9) may, for example, include twelve equally spaced poles and associated windings, that cooperate with, for example, eight rotor poles (shown schematically by dots on magnet 24). A motor driving circuit (not shown) switches timed current pulses into the stator windings to generate flux that interacts with the flux produced by magnet 24 to generate torque on the rotor 20. This rotates the rotor and enables data transfer to occur between the read/write heads 32 and the recording surfaces of disks 30.

Figure 2:
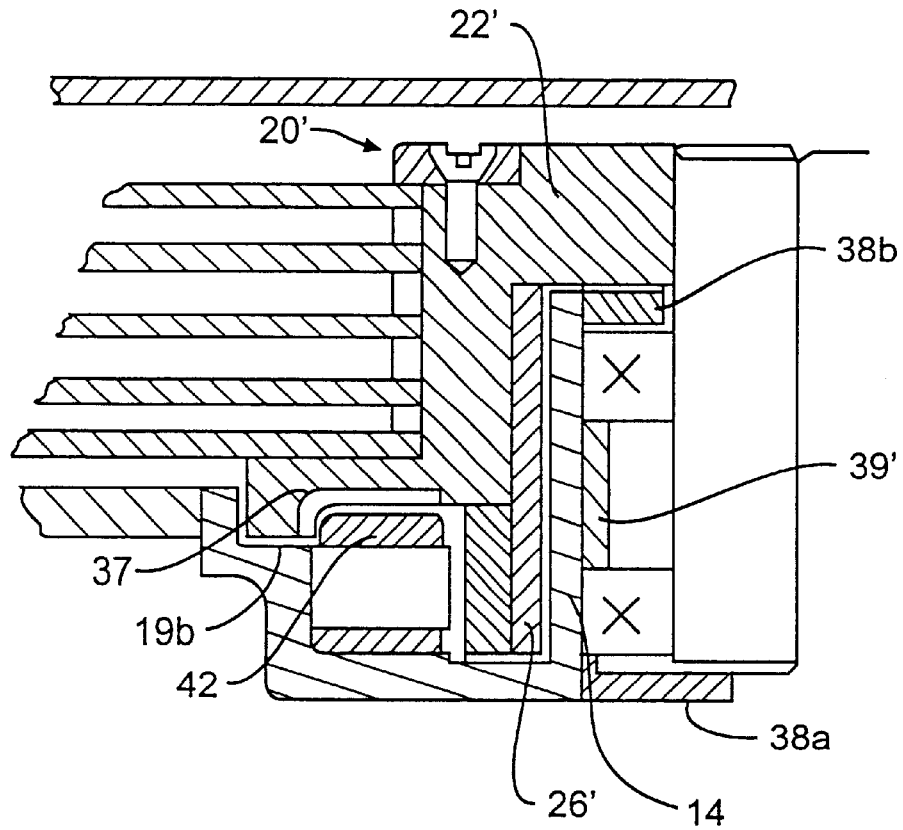
FIGS. 2, 3, 4, and 5 are cross-sections taken along the spindle axis, each illustrating a modified form of the spindle motor.

FIG. 2 shows a second embodiment of a disk storage device having a modified form of rotor assembly 20'. The aluminum hub 22' is fitted with a ferromagnetic insert 37 conforming generally to and spaced from the upper side of winding 42 and curving down to a closely-spaced gap from inner peripheral surface 19b of housing wall 12. Insert 37 acts as a shield to prevent stray magnetic flux from impinging on the data storage disks. Ferromagnetic magnet support member 26' is extended along, and uniformly spaced from, substantially the entire length of bearing tube 14. The outer surface of bearing tube 14 and the inner surface of support sleeve 26' are precisely machined to leave a narrow "gap seal" running between them.

Figure 3:
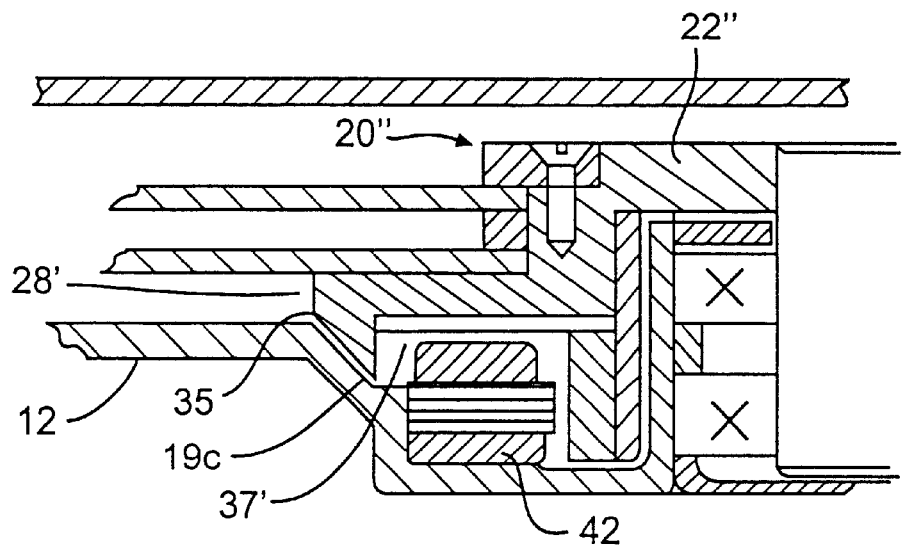

FIG. 3 shows a third embodiment of a disk storage device having a modified form of rotor assembly 20". The alumi- num hub 22" is fitted with a flat ferromagnetic shielding insert 37' spaced from the upper side of stator winding 42. Flange 28' of hub 22" is terminated in beveled surface 35 that forms a gap seal with a corresponding surface 19c of housing 12. Surface 19c replaces surfaces 19a and 19b of FIG. 2. Particularly for devices of reduced dimensions, the configuration of FIG. 3 simplifies manufacture and reduces cost.

Figure 4:
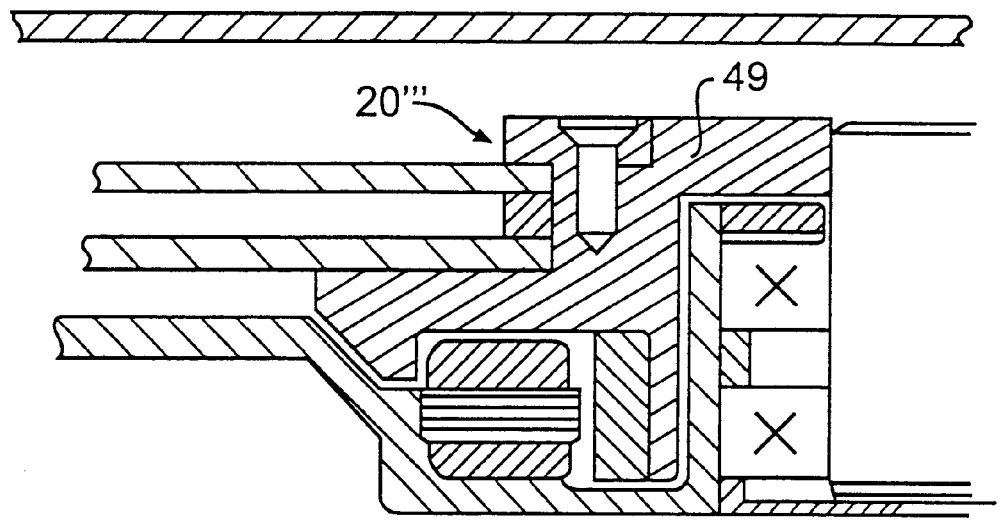

In the embodiment of FIG. 4, a steel hub 49 replaces the aluminum hub of previous embodiments and eliminates the need for separate magnetic yoke and magnetic shielding parts. This configuration enables further reduction of dimensions while also enabling reduced manufacturing cost.

Figure 5:
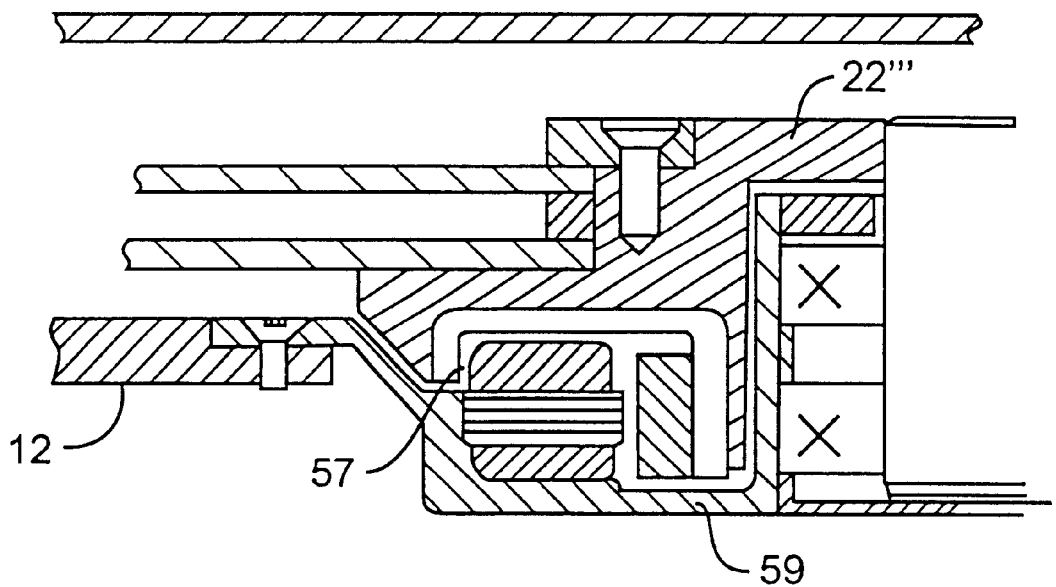

In the embodiment of FIG. 5, magnetic shielding yoke 57 replaces ferromagnetic insert 37 and ferromagnetic magnet support 26 of FIG. 2 and is fitted inside a further modified machined form of aluminum hub 22'". This embodiment also shows a separate assembly flange 59 supporting the spindle motor and mounted to lower wall 12 of the clean room housing.

Figure 6:
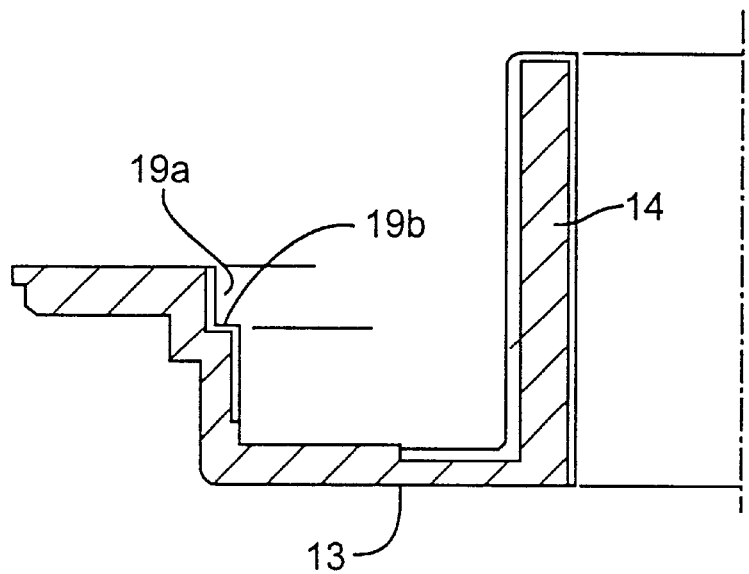
FIGS. 6 and 7 are partial cross-section of the preceding embodiments, showing machining details for relevant portions of the lower housing wall, hub, and bearing tube.
Figure 7:
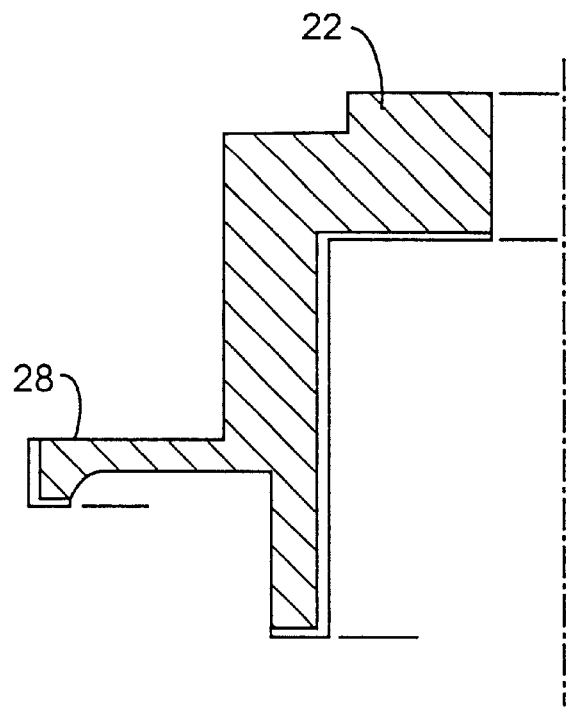

FIGS. 6 and 7 show the surfaces, with heavy lines, of the base plate 13 and hub 22 requiring machining for relatively close tolerances in the embodiment of FIG. 1. These surfaces include surfaces 19a and 19b, the vertical and top surfaces of bearing tube 14, and the surface of lower wall 12 where the lower edge of rotor 20 must pass over it. As shown in FIG. 7, the close tolerance surfaces of hub 22 are those at the periphery of flange 28 and inner cavity of hub 22. Preferably, these surfaces should be machined in a single chucking step to assure a close fit.

Figure 8:
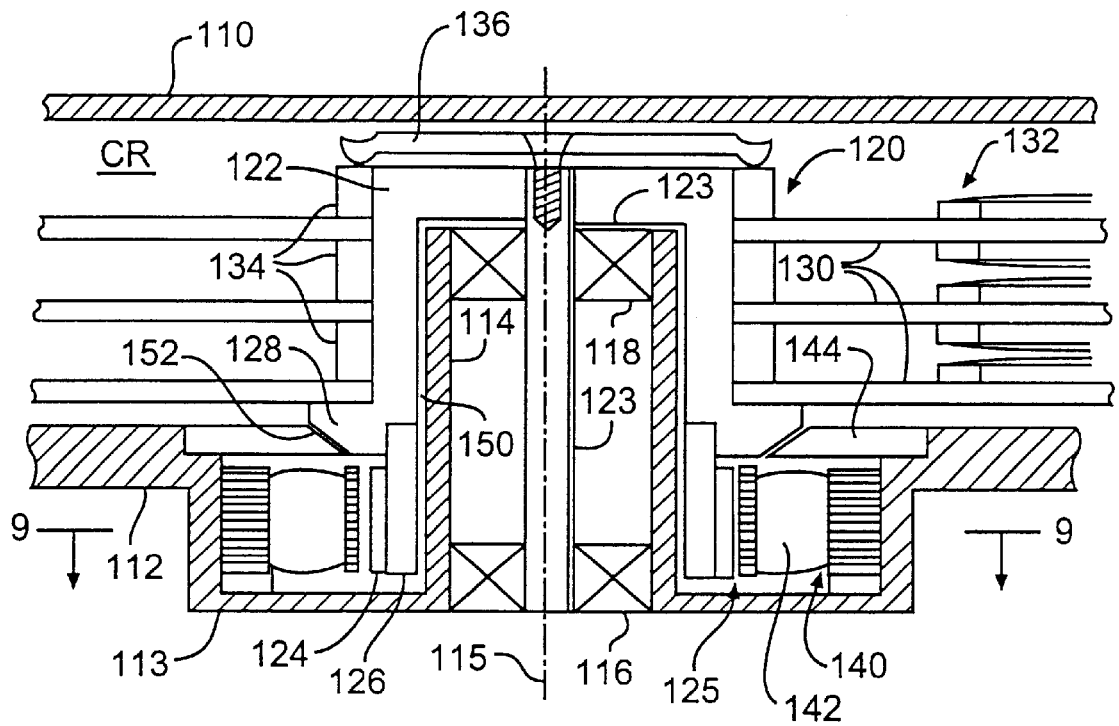
FIG. 8 is a cross-section taken along the spindle axis of a disk storage device employing a still further embodiment of the invention.
Figure 9:
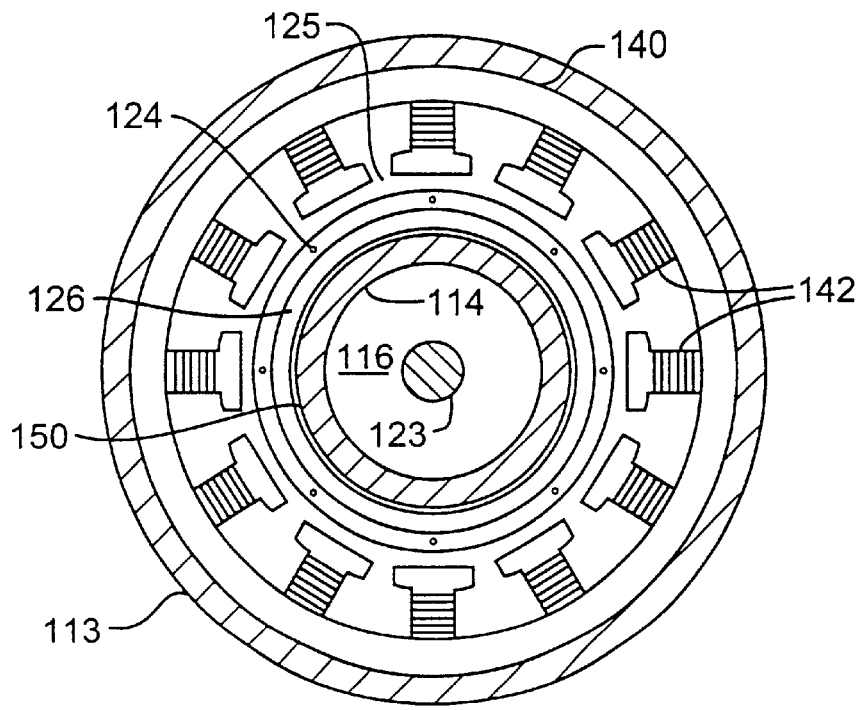
FIG. 9 is a cross-section taken along line 9—9 of FIG. 8 perpendicular to the spindle axis, showing how the stator lamination and windings interact with the magnet ring of the rotor.

In the embodiment of FIG. 8, the illustrated disk storage device is similar in most respect to that of FIG. 1. It includes a housing having an upper partition or wall 110 and a lower partition or wall 112 which adjoin side walls (not shown) to enclose a substantially sealed "clean room chamber" CR similar to that of FIG. 1. Data storage disks 130 are mounted on a hub 122 that is part of a rotor assembly 120 of a brushless DC spindle motor. The drive elements of the spindle motor are supported inside the clean room chamber within a recessed portion 113 of the lower wall 112 of the HDD housing. Hub 122 is cylindrically shaped and dimensioned to fit through the center opening of the disks. The hub has a radially extending shoulder 128 for supporting the lower disk 130 that may be part of a disk stack. The hub 122 may be made of an aluminum alloy, which is a material that is suitable for use after machining in a clean room enviromnent. One or more spacer rings 134 separate the disks and a clamping spring 136 is fastened to the closed end of the rotor 120 and presses against the upper spacer ring 134 to couple the disks to the hub 122.

The rotor assembly 120 rotates on a shaft 123 that is press-fit into or otherwise attached to the closed end of the rotor. Shaft 123 is supported to rotate about the spindle axis 115 by a pair of axially spaced bearings 116 and 118. Bearings 116 and 118 are mounted within a bearing tube 114 or other form of cylindrical support member that is an integral part of, or is attached to, the recessed wall portion 113. The recessed wall portion 113 may be an integral part of the HDD housing wall 112, or it may be in the form of a detachable assembly flange. If the latter, the spindle motor can be manufactured as a separate unit that is installed into an opening in the HDD housing at the time of final HDD assembly.

The spindle motor further includes a permanent magnet 124 that is in the form of an annular ring affixed to a cylindrical ferromagnetic support member 126. The latter is attached to the lower end of the rotor hub portion 122. Hub 122 has a cylindrically-shaped central cavity 129 that fits over the upper end of bearing tube 114. The magnet support member 126 encircles the bearing tube 114. A narrow gap 150 is formed between the outer surface of the bearing tube and the inner surface of the rotor 120 and forms a "gap seal" to reduce the transfer of particles and other contaminants emanating from the bearings 116 and 118 into the clean room chamber. A ring 144 is set into the housing wall 112 and surrounds the disk mounting flange 128 of the hub 122. A narrow gap 152 is formed between the outer periphery of the flange 128 and the inner periphery of the ring 144 and functions as a further gap seal to retard the transfer of contaminants into the clean room chamber.

A stator assembly 140 is supported within the recessed wall portion 113 and encircles the rotor magnet 124. The stator 140 has windings 142 wound on the stator laminations and a plurality of poles separated from the magnet 124 by a cylindrically-shaped air gap 125. As shown in FIG. 9, the stator 140 may, for example, include twelve equally spaced poles and associated windings, that cooperate with, for example, eight rotor poles (shown schematically by dots on magnet 124). A motor driving circuit (not shown) switches timed current pulses into the stator windings to generate flux that interacts with the flux produced by magnet 124 to generate torque on the rotor 120. This rotates the rotor and enables data transfer to occur between the read/write heads 132 and the recording surfaces of disks 130.

Figure 10:
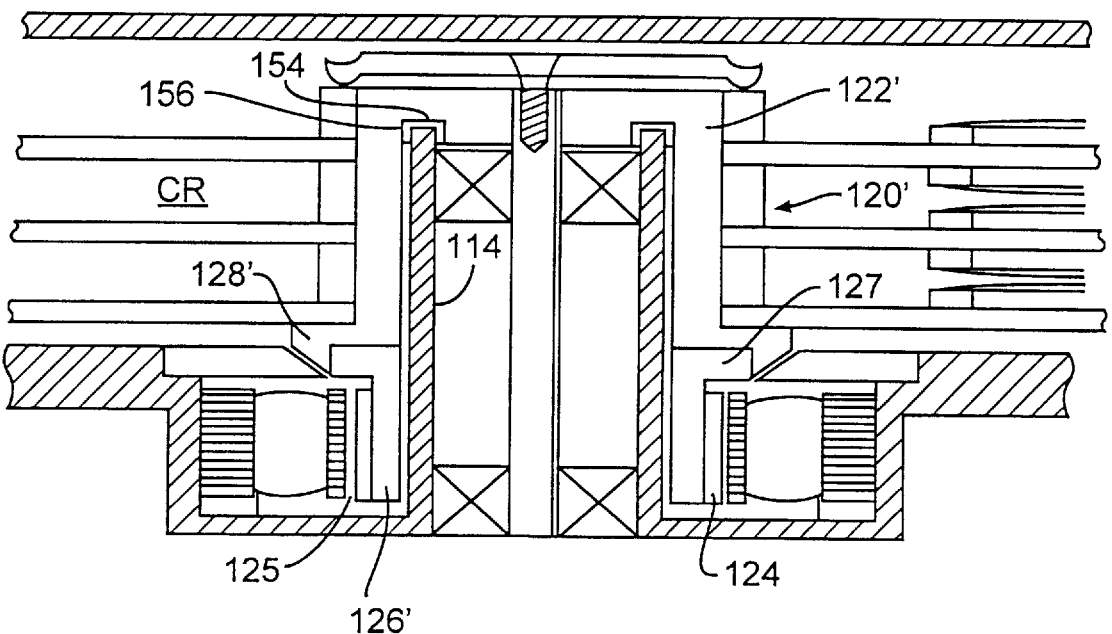
FIG. 10 is a cross-section taken along the spindle axis showing another modified form of the spindle motor.

FIG. 10 shows another embodiment of a disk storage device having a modified form of rotor assembly 120'. The underside of the closed end of the hub 122' is provided with an annular groove 154 that mates with the extended upper end of the bearing tube 114 to form a labyrinth seal 156 that further enhances retardation of contaminant particle movement toward the clean room chamber. FIG. 10 also shows that modified rotor assembly 122' employs a ferromagnetic magnet support member 126' that has a radially-extending lip 127 projecting into the disk support flange 128'. The lip 127 extends across the end of the magnet 124, the air gap 125 and partially encloses the pole faces of the stator lamination. Any stray flux that may emanate from the area of the motor air gap will be contained by the lip 127 and prevented from impinging on the data storage disks 130.

Figure 11:
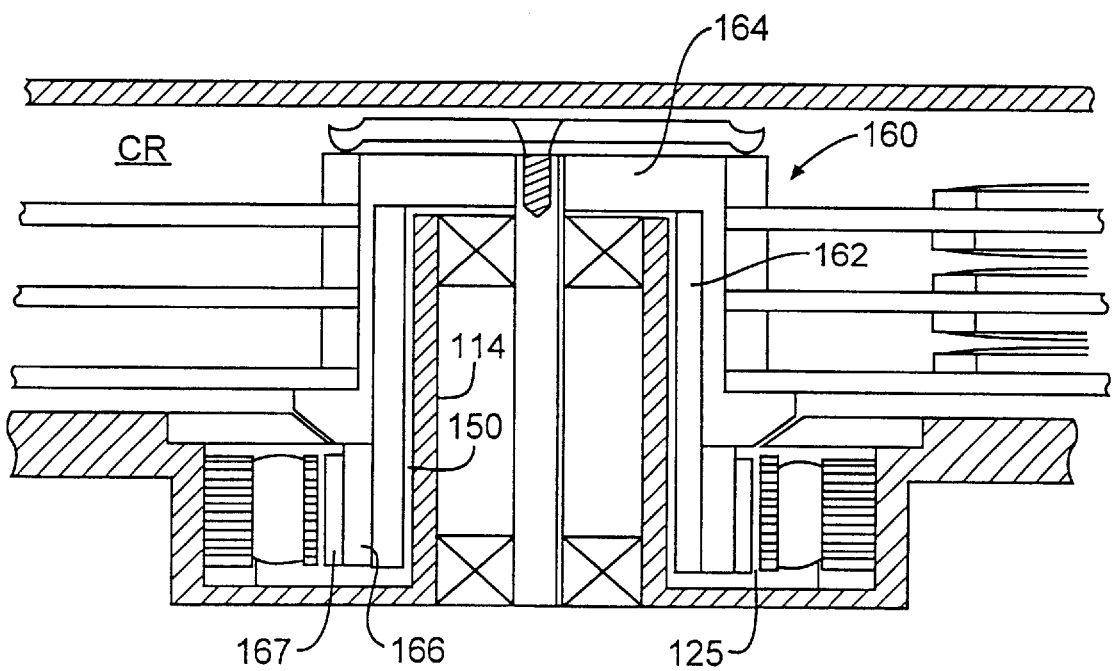
FIG. 11 is a similar view illustrating yet another embodiment of the spindle motor.

FIG. 11 illustrates a still further embodiment of data storage device having a further modified spindle motor. The rotor assembly 160 is provided with an internal sleeve 162 that is press fit or glued inside the hub portion 164. The permanent magnet ring 167 and ferromagnetic support member 166 are affixed about an end of the sleeve 162. Sleeve 162 can be formed of an aluminum alloy and has a precisely machined inner diameter. The outer diameter of the bearing tube 114 may also be precisely machined to permit close spacing with respect to the sleeve 162 so that gap seal 150 is made very narrow and hence more effective in retarding transfer of contaminant particles toward the clean room CR.

Sleeve 162 also positions the magnet ring 167 and air gap further away from the axis of rotation. This increases the radius of the magnet 167 and the air gap 125 so that the magnet and air gap both have diameters substantially exceeding the diameter of the disk mounting hub 164. In this regard, the embodiment of FIG. 11 is similar to that of FIG. 1. This permits generation of a higher motor torque without increasing the height of the spindle or the diameter of the hub. In fact, the motor arrangement of the invention allows the torque produced by the motor to be essentially independent of both the spindle height and hub diameter.

As illustrated in the above, the inner rotor-rotating shaft design of the disk storage device of the present invention provides several advantages. Among these are the following.

The rotor assembly has reduced mass because the hub portion is essentially hollow and the magnetic ring and ferromagnetic support member are not affixed to a radially-extending support structure, as is required in an outer rotor design, allowing the rotor mass to be reduced and located closer to the axis of rotation. These features allow the same drive torque to accelerate the spindle assembly to the required operating speed in a shorter time and reduce vibrations at higher operating speeds. Further, the motor diameter can be increased without incurring a proportionate increase in rotor mass.

Still further, the spindle axis is fixed by a relatively large diameter bearing tube or cylindrical structure, which is more rigid than the stationary shaft or post usually used to support the spindle.

In addition, because the stator components are located away from the spindle axis, there is more room in the center of the assembly for the bearings and they can be spaced further apart to reduce spindle run out due to play in the bearings.

Still further, the rotor configuration allows for an extended-length cylindrical gap seal for providing enhanced isolation of the bearings from the clean room. The gap seal may be used along with one or more labyrinth seals (such as formed by the gap 156 shown in FIG. 10) to further retard the migration of contaminants into the clean room chamber.

Although we have shown and described this invention in connection with certain embodiments, additional alternatives, modifications, and variations may be apparent to those skilled in the art in view of the foregoing description. Accordingly, this invention is intended to embrace all such alternatives, modifications, and variations as fall within the spirit and scope of the appended claims.

What is claimed is:

1. A disk storage device comprising:
   a housing enclosing a clean chamber;
   at least one data storage disk located in the clean chamber;
   a read head for reading data recorded on said at least one data storage disk; and
   a motor for rotating said at least one data storage disk past the read head, the motor including
      a rotor having a disk mounting portion positioned in the clean chamber and coupled to said at least one data storage disk;
      a shaft located along an axis of rotation and affixed to said rotor for rotation therewith;
      a support member contiguous with said housing including a bearing support;
      first and second axially spaced bearings rotatably supporting said shaft and mounted within said bearing support;
      a stator surrounding said bearing support and positioned on (the same side) of said support member as said clean chamber, said stator having one or more poles and windings;
      a ring element affixed to said housing and extending over the stator, said ring element having an opening surrounding an outer periphery of said rotor; and
      an annular permanent magnet surrounded by the stator poles and spaced to form a substanially cylindrical air gap therewtih, and
      a ferromagnetic portion included as part of said rotor, wherein said ferromagnetic portion has a substantially cylindrical surface upon which the annular permanent magnet is mounted and a radially extending portion extending over and radially beyond the permanent magnet and covering at least a portion of the air gap, said permanent magnet being affixed to the rotor and arranged to interact with magnetic flux produced by the stator to drive the rotor and rotate said at least one data storage disk about the axis of rotation, wherein the disk mounting portion of the rotor includes a substantially cylindrical portion that extends through the opening of the at least one data storage disk, and the outer diameter of said permanent magnet is greater than the diameter of the circular opening of the at least one data storage disk, wherein the housing comprises a recessed portion having a substantially cylindrical wall surrounding the stator, and wherein the ring element is mounted on an end of said substantially cylindrical wall; and wherein the bearing support comprises a hollow cylinder supporting the bearings on an inner surface thereof, and wherein a substantially cylindrical portion of the ferromagnetic portion has an edge shaped to cooperate and complement a curved surface at a junction of the hollow cylinder and said housing.

2. A disk storage device comprising:

a housing enclosing a clean chamber;

at least one data storage disk located within said clean chamber;

a read head for reading data recorded on said at least one data storage disk; and a motor for rotating said at least one data storage disk past said read head, said motor including:

a rotor having a disk mounting portion positioned within said clean chamber and coupled to said at least one data storage disk;

a shaft located along an axis of rotation and affixed to said rotor for rotation therewith;

a support member contiguous with said housing including a bearing support;

first and second axially spaced bearings rotatably supporting said shaft and mounted within said bearing support;

a stator surrounding said bearing support and positioned on the same side of said support member as said clean chamber, said stator having one or more poles and windings;

a ring element affixed to said housing and extending over the stator, said ring element having an opening surrounding an outer periphery of said rotor;

an annular permanent magnet surrounded by said stator poles and spaced therefrom to form a substantially cylindrical air gap therewith; and a ferromagnetic portion included as part of said rotor, wherein said ferromagnetic portion has a substantially cylindrical surface upon which the annular permanent magnet is mounted and a radially extending portion extending over and radially beyond the permanent magnet and covering at least a portion of the air gap, said permanent magnet arranged to interact with magnetic flux produced by said stator to drive said rotor and rotate said at least one data storage disk about said axis of rotation.

3. The disk storage device of claim 2, wherein the bearing support comprises a hollow cylinder supporting the bearings on an inner surface thereof, and wherein a substantially cylindrical portion of the ferromagnetic portion has an edge shaped to cooperate and complement a curved surface at a junction of the hollow cylinder and said support member.

4. The disk storage device of claim 2, wherein the housing comprises a recessed portion having a substantially cylindrical wall surrounding the stator, and wherein the ring element is mounted on an end of said substantially cylindrical wall.

5. The disk storage device of claim 2, wherein said disk mounting portion of said rotor has a substantially cylindrical cavity and a closed end at which said shaft is affixed to said rotor, said substantially cylindrical cavity closely surrounding said bearing support and forming a substantially cylindrical gap seal extending to said housing.

6. The disk storage device of claim 2, wherein the bearing support comprises a hollow cylinder supporting the bearings on an inner surface thereof, wherein said disk mounting portion of said rotor contains an annular groove that mates with the bearing support forming a labyrinth seal between the bearing support and the rotor.

7. The disk storage device of claim 2, wherein said bearing support comprises a hollow cylinder supporting said first and second bearings on an inner surface thereof, said storage device further comprising a washer located near an end of said bearing support between said bearings and said disk mounting portion of said rotor, said washer acting to retard the transfer of particles from said bearing to said clean chamber.

8. The disk storage device of claim 2, wherein the disk mounting portion includes a substantially cylindrical portion that extends through the circular opening of the at least one data storage disk, and wherein an inner diameter of said permanent magnet is less than the diameter of the circular opening of the at least one data storage disk.

9. The disk storage device of claim 2, wherein the disk mounting portion includes a substantially cylindrical portion that extends through the circular opening of the at least one data storage disk, and wherein an outer diameter of said permanent magnet is greater than the diameter of the circular opening of the at least one data storage disk.

10. A disk storage device comprising:

a housing enclosing a clean chamber;

at least one data storage disk having a circular opening and located within said clean chamber;

a read head for reading data recorded on said at least one data storage disk; and a motor for rotating said at least one data storage disk past said read head, said motor including:

a rotor having a disk mounting portion positioned within said clean chamber and coupled to said at least one data storage disk;

a shaft located along an axis of rotation and affixed to said rotor for rotation therewith;

a support member contiguous with said housing including a bearing support;

first and second axially spaced bearings rotatably supporting said shaft and mounted within said bearing support;

a stator surrounding said bearing support and positioned on the same side of said support member as said clean chamber, said stator having one or more poles and windings; and an annular permanent magnet surrounded by said stator poles and spaced therefrom to form a substantially cylindrical air gap therewith, said permanent magnet arranged to interact with magnetic flux produced by said stator to drive said rotor and rotate said at least one data storage disk about said axis of rotation, wherein the disk mounting portion of the rotor includes a substantially cylindrical portion that extends through the opening of the at least one data storage disk, and the outer diameter of said permanent magnet is greater than the diameter of the circular opening of the at least one data storage disk, and said rotor includes a ferromagnetic portion, wherein said ferromagnetic portion has a substantially cylindrical surface upon which the annular permanent magnet is mounted and a radially extending portion extending over and radially beyond the permanent magnet and covering at least a portion of the air gap.

11. The disk storage device of claim 9, wherein said disk mounting portion of said rotor has a substantially cylindrical cavity and a closed end at which said shaft is affixed to said rotor, said substantially cylindrical cavity closely surrounding said bearing support and forming a substantially cylindrical gap seal extending to said housing.

12. The disk storage device of claim 11, wherein the substantially cylindrical cavity of said disk mounting portion includes an inner surface providing a uniform gap seal with respect to said bearing support.

13. The disk storage device of claim 10, wherein the disk mounting portion of said rotor forms an additional gap seal with respect to said housing.

14. The disk storage device of claim 10, wherein said bearing support comprises a hollow cylinder supporting said first and second bearings on an inner surface thereof, said storage device further comprising a washer located near an end of said bearing support between said bearings and said disk mounting portion of said rotor, said washer acting to retard the transfer of particles from said bearing to said clean chamber.

15. The disk storage device of claim 10, wherein the inner diameter of said permanent magnet is less than the diameter of the circular opening of the at least one data storage disk.

16. A disk storage device comprising:
a housing enclosing a clean chamber;
at least one data storage disk located within said clean chamber;
a read head for reading data recorded on said at least one data storage disk; and
a motor for rotating said at least one data storage disk past said read head, said motor including:
  a rotor having a disk mounting portion positioned within said clean chamber, said disk mounting portion including a radially extending shoulder supporting said data storage disk;
  a stator having one or more windings supported on a member contiguous with said housing, said stator being located on the same side of said housing as said clean chamber;
  a shaft aligned along an axis of rotation and affixed to said rotor for rotation therewith;
  a bearing support member having bearings rotatably supporting said shaft;
  a ring element affixed to said housing and extending over the stator, said ring element having an opening surrounding said rotor;
  an annular permanent magnet affixed to said rotor and positioned within said stator so as to form an air gap therewith; and
  a ferromagnetic portion included as part of said rotor, wherein said ferromagnetic portion has a first substantially cylindrical surface upon which the annular permanent magnet is mounted and a radially extending portion extending over and radially beyond the permanent magnet covering at least a portion of the air gap,
  said stator and permanent magnet being located immediately adjacent the radially extending shoulder of said disk mounting portion of said rotor and positioned on a side thereof opposite to said data storage disk, and
  whereby flux produced by said stator interacts with said permanent magnet to rotate said rotor and data storage disk about said axis of rotation.

17. The disk storage device of claim 16, wherein the bearing support comprises a hollow cylinder supporting the bearings on an inner surface thereof, and wherein a substantially cylindrical portion of the ferromagnetic portion has an edge shaped to cooperate and complement a curved surface at a junction of the hollow cylinder and said housing.

18. The disk storage device of claim 16, wherein the housing comprises a recessed portion having a substantially cylindrical wall surrounding the stator, and wherein the ring element is mounted on an end of said substantially cylindrical wall.

19. The disk storage device of claim 16, wherein said disk mounting portion of said rotor has a substantially cylindrical cavity and a closed end at which said shaft is affixed to said rotor, said substantially cylindrical cavity closely surrounding said bearing support and forming a substantially cylindrical gap seal extending to said housing.

20. The disk storage device of claim 16, wherein the bearing support member comprises a hollow cylinder supporting the bearings on an inner surface thereof, wherein said disk mounting portion of said rotor contains an annular groove that mates with the bearing support member forming a labyrinth seal between the bearing support and the rotor.

21. The disk storage device of claim 16, wherein said bearing support comprises a hollow cylinder supporting said bearings on an inner surface thereof, said storage device further comprising a washer located near an end of said bearing support between said bearings and said disk mounting portion of said rotor, said washer acting to retard the transfer of particles from said bearing to said clean chamber.

22. The disk storage device of claim 16, wherein the disk mounting portion includes a substantially cylindrical portion that extends through the circular opening of the at least one data storage disk, and wherein an inner diameter of said permanent magnet is less than the diameter of the circular opening of the at least one data storage disk.

23. The disk storage device of claim 16, wherein the disk mounting portion includes a substantially cylindrical portion that extends through the circular opening of the at least one data storage disk, and wherein an outer diameter of said permanent magnet is greater than the diameter of the circular opening of the at least one data storage disk.

24. A disk storage device comprising:
a housing enclosing a clean chamber;
at least one data storage disk having a circular opening and located within said cleaning chamber;
a read head for reading data recorded on said at least one data storage disk; and
a motor for rotating said at least one data storage disk past said read head, said motor including:
  a rotor having a disk mounting portion positioned within said clean chamber, said disk mounting portion including a radially extending shoulder supporting said data storage disk;
  a stator having one or more windings supported on a member contiguous with said housing, said stator being located on the same side of said housing as said clean chamber;
  a shaft aligned along an axis of rotation and affixed to said rotor for rotation therewith;

a bearing support member having bearings rotatably supporting said shaft;

an annular permanent magnet affixed to said rotor and positioned within said stator so as to form an air gap therewith;

said stator and permanent magnet being located immediately adjacent the radially extending shoulder of said disk mounting portion of said rotor and positioned on a side thereof opposite to said data storage disk, whereby flux produced by said stator interacts with said permanent magnet to rotate said rotor and data storage disk about said axis of rotation, wherein the disk mounting portion of said rotor includes a substantially cylindrical portion that extends through the circular opening of the at least one data storage disk, and the outer diameter of said permanent magnet is greater than the diameter of said circular opening of the at least one data storage disk, and said rotor includes a ferromagnetic portion, wherein said ferromagnetic portion has a substantially cylindrical surface upon which the annular permanent magnet is mounted and a radially extending portion extending over and radially beyond the permanent magnet covering at least a portion of the air gap.

25. The disk storage device of claim 24, wherein said disk mounting portion of said rotor has a substantially cylindrical cavity and a closed end at which said shaft is affixed to said rotor, said substantially cylindrical cavity closely surrounding said bearing support and forming a substantially cylindrical gap seal extending to said housing.

26. The disk storage device of claim 25, wherein the substantially cylindrical cavity of said disk mounting portion includes an inner surface providing a uniform gap seal with respect to said bearing support.

27. The disk storage device of claim 24, wherein the disk mounting portion of said rotor forms an additional gap seal with respect to said housing.

28. The disk storage device of claim 24, wherein said bearing support comprises a hollow cylinder supporting said bearings on an inner surface thereof, said storage device further comprising a washer located near an end of said bearing support between said bearings and said disk mounting portion of said rotor, said washer acting to retard the transfer of particles from said bearing to said clean chamber.

29. The disk storage device of claim 24, wherein an inner diameter of said permanent magnet is less than the diameter of the circular opening of the at least one data storage disk.

30. A disk storage device comprising:

a housing enclosing a clean chamber;

at least one data storage disk located within said clean chamber;

a read head for reading data recorded on said at least one data storage disk; and a motor for rotating said at least one data storage disk past said read head, said motor including:

a rotor having an annular magnetic flux producing and conducting member and a hub portion, said hub portion extending through a central opening in said at least one data storage disk and having a central and substantially cylindrical cavity opening toward one end of said hub portion, said magnetic flux producing and conducting member being affixed to an end of said hub portion such that the magnetic flux producing and conduction member is concentric with said central and substantially cylindrical cavity, and wherein an outer diameter of said flux producing and conducting member is greater than a diameter of the central opening in said at least one data storage disk;

a stator having at least one winding, said stator positioned to surround said magnetic flux producing and conducting member and spaced therefrom by an air gap;

a bearing support aligned with an axis of rotation that extends through the central and substantially cylindrical cavity of said hub portion and having at least one bearing member rotatably supporting said rotor, said bearing support having a substantially cylindrical outer surface that is spaced from the inner wall of said central and substantially cylindrical cavity of said hub portion; and an annular member affixed to the housing and extending over the stator and cooperating with a surface on the hub such that a portion of the annular member extends beneath a portion of the hub to substantially enclose said stator and stator windings.

31. The disk storage device of claim 30 comprising a shaft affixed to said rotor and aligned with an axis of rotation that extends through the central and substantially cylindrical cavity of said hub portion.

32. The disk storage device of claim 30, wherein said bearing support comprises a hollow cylinder supporting first and second bearings on an inner surface thereof.

33. The disk storage device of claim 30 further comprising a washer located near an end of said bearing support between said bearings and said hub portion of said rotor, said washer acting to retard the transfer of particles from said bearing to said clean chamber.

34. The disk storage device of claim 30, wherein said hub portion of said rotor comprises a non-ferromagnetic material that is suitable for use after machining in a clean room environment, and a substantially cylindrical ferromagnetic support member supporting said magnetic flux producing and conducting member.

35. The disk storage device of claim 30, wherein said motor further comprises a magnetic shielding element.

36. The disk storage device of claim 30, wherein an outer diameter of said magnetic flux producing and conducting member is greater than the diameter of the central opening of the at least one data storage disk.

37. A disk storage device comprising:

a housing enclosing a clean chamber;

at least one data storage disk located within said clean chamber;

a read head for reading data recorded on said at least one data storage disk; and a motor for rotating said at least one data storage disk past said read head, said motor including:

a rotor having an annular magnetic flux producing and conducting member, a non-ferromagnetic hub portion, and a substantially cylindrical ferromagnetic support member, said hub portion extending through a central opening in said at least one data storage disk, said rotor forming a substantially cylindrical central cavity with an opening toward a lower end, said magnetic flux producing and conducting member being affixed to an end of said ferromagnetic support member such that the magnetic flux producing and conducting member is concentric with said central cavity, and wherein an outer diameter of said flux producing and conducting member is greater than a diameter of the central opening in said at least one data storage disk;

a stator having at least one winding, said stator positioned to surround said magnetic flux producing and conducting member and spaced therefrom by an air gap, and wherein a radially extending portion of the ferromagnetic support member extends over and radially beyond the annular magnetic flux producing and conducting member and covers a portion of the air gap;

a bearing support aligned with an axis of rotation that extends through the central cavity of said rotor and having at least one bearing member rotatably supporting said rotor, said bearing support having a substantially cylindrical outer surface that is spaced from the inner wall of said ferromagnetic support member by a narrow gap that retards the escape of particles from said bearing member into said clean chamber.

38. The disk storage device of claim 37 comprising a shaft affixed to said rotor and aligned with an axis of rotation that extends through the central cavity of said rotor.

39. The disk storage device of claim 37, wherein said bearing support comprises a hollow cylinder supporting first and second bearings on an inner surface thereof.

40. The disk storage device of claim 37, wherein said hub portion of said rotor comprises a non-ferromagnetic material that is suitable for use after machining in a clean room environment.

41. The disk storage device of claim 37, wherein an outer diameter of said magnetic flux producing and conducting member is greater than the diameter of the central opening of the at least one data storage disk.

* * * * *